(12) United States Patent
Callaghan

(10) Patent No.: US 9,135,430 B2
(45) Date of Patent: Sep. 15, 2015

(54) DIGITAL RIGHTS MANAGEMENT SYSTEM AND METHOD

(75) Inventor: David M. Callaghan, Concord, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 334 days.

(21) Appl. No.: 12/629,470

(22) Filed: Dec. 2, 2009

(65) Prior Publication Data

US 2010/0077217 A1    Mar. 25, 2010

Related U.S. Application Data

(63) Continuation of application No. 10/814,539, filed on Mar. 31, 2004, now abandoned.

(51) Int. Cl.
*H04L 9/32*     (2006.01)
*G06F 21/44*    (2013.01)
*G06F 21/33*    (2013.01)
(Continued)

(52) U.S. Cl.
CPC ............. *G06F 21/445* (2013.01); *G06F 21/33* (2013.01); *G06F 21/606* (2013.01); *G06F 21/62* (2013.01); *H04L 9/3247* (2013.01); *H04L 9/3263* (2013.01); *G05B 2219/24167* (2013.01)

(58) Field of Classification Search
CPC .... H04L 9/3263; H04L 9/3265; H04L 9/3268
USPC .................................................. 713/175, 182
See application file for complete search history.

(56) References Cited

U.S. PATENT DOCUMENTS

| 5,513,095 A | 4/1996 | Pajonk |
| 5,781,633 A | 7/1998 | Tribble et al. |

(Continued)

FOREIGN PATENT DOCUMENTS

| DE | 10200681 A1 | 7/2003 |
| EP | 0813121 A2  | 12/1997 |

(Continued)

OTHER PUBLICATIONS

Park, et al. "RBAC on the Web by Smart Certificates" (1991) Proceedings of the 4th ACM Workshop on Role-Based Access Control, Fairfax, VA, Oct. 28-29, 1999, pp. 1-9.

(Continued)

*Primary Examiner* — Dede Zecher
*Assistant Examiner* — Abdullah Almamun
(74) *Attorney, Agent, or Firm* — Amin, Turocy & Watson, LLP

(57) ABSTRACT

The present invention concerns application of digital rights management to industrial automation devices including programmable logic controllers (PLCs), I/O devices, and communication adapters. Digital rights management involves a set of technologies for controlling and managing access to device objects and/or programs such as ladder logic programs. Access to automation device objects and/or programs can be managed by downloading rules of use that define user privileges with respect to automation devices and utilizing digital certificates, among other things, to verify the identity of a user desiring to interact with device programs, for example. Furthermore, the present invention provides for secure transmission of messages to and amongst automation devices utilizing public key cryptography associated with digital certificates.

20 Claims, 12 Drawing Sheets

(51) Int. Cl.
*G06F 21/60* (2013.01)
*G06F 21/62* (2013.01)

(56) References Cited

U.S. PATENT DOCUMENTS

| | | | |
|---|---|---|---|
| 6,084,859 A | 7/2000 | Ratcliff et al. | |
| 6,233,341 B1* | 5/2001 | Riggins | 380/277 |
| 6,396,928 B1 | 5/2002 | Zheng | |
| 6,959,290 B2* | 10/2005 | Stefik et al. | 705/51 |
| 6,961,633 B1 | 11/2005 | Marbach et al. | |
| 6,961,763 B1 | 11/2005 | Wang et al. | |
| 6,993,508 B1 | 1/2006 | Major et al. | |
| 7,904,720 B2* | 3/2011 | Smetters et al. | 713/175 |
| 8,019,989 B2* | 9/2011 | Bosler | 713/156 |
| 2001/0056494 A1* | 12/2001 | Trabelsi | 709/229 |
| 2002/0026581 A1 | 2/2002 | Matsuyama et al. | |
| 2002/0059144 A1 | 5/2002 | Meffert et al. | |
| 2002/0120521 A1 | 8/2002 | Forth et al. | |
| 2002/0144119 A1* | 10/2002 | Benantar | 713/171 |
| 2002/0152376 A1* | 10/2002 | Eigeles | 713/156 |
| 2003/0061274 A1 | 3/2003 | Lo | |
| 2003/0093676 A1* | 5/2003 | Kawamura et al. | 713/175 |
| 2003/0145221 A1 | 7/2003 | Atzmueller et al. | |
| 2003/0172090 A1 | 9/2003 | Asunmaa et al. | |
| 2004/0107345 A1 | 6/2004 | Brandt et al. | |
| 2004/0158716 A1* | 8/2004 | Turtiainen et al. | 713/172 |
| 2004/0162996 A1* | 8/2004 | Wallace et al. | 713/201 |
| 2004/0168053 A1 | 8/2004 | Kaszkin et al. | |
| 2004/0249922 A1 | 12/2004 | Hackman et al. | |
| 2005/0021705 A1 | 1/2005 | Jurisch | |
| 2005/0175183 A1* | 8/2005 | Ovadia et al. | 380/278 |
| 2009/0037735 A1* | 2/2009 | O'Farrell et al. | 713/170 |

FOREIGN PATENT DOCUMENTS

| | | |
|---|---|---|
| EP | 0813132 A2 | 12/1997 |
| WO | WO 02095506 A2 | 11/2002 |
| WO | WO 03036400 A | 5/2003 |

OTHER PUBLICATIONS

Nikander, et al. "Policy and Trust in Open Multi-Operator Networks" (2000) Telecommunication Network Intelligence 6th International Conference on Intelligence in Networks, Kluwer Academic Publishers, Norwell, MA pp. 419-436.

European Search report dated Oct. 20, 2005 and mailed Nov. 21, 2005 for European Patent Application Serial No. 05006916, 5 pages.

OA dated Sep. 4, 2009 for U.S. Appl. No. 10/814,539, 18 pages.

OA dated Jan. 28, 2009 for U.S. Appl. No. 10/814,539, 16 pages.

OA dated Jul. 28, 2008 for U.S. Appl. No. 10/814,539, 11 pages.

OA dated Feb. 8, 2008 for U.S. Appl. No. 10/814,539, 21 pages.

* cited by examiner

DIGITAL RIGHTS MANAGEMENT SYSTEM AND METHOD

CROSS REFERENCE TO RELATED APPLICATIONS

This application is a continuation of U.S. patent application Ser. No. 10/814,539, filed on Mar. 31, 2004, entitled "DIGITAL RIGHTS MANAGEMENT SYSTEM AND METHOD", the entirety of which is incorporated herein by reference.

TECHNICAL FIELD

The present invention relates generally to industrial control systems and more particularly towards digital rights management and secure communication to and amongst industrial automation devices.

BACKGROUND

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate to or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Presently, industrial control systems have no viable means of controlling and managing access to industrial control programs and documents. Furthermore, there is little or no mechanism to secure communications to and amongst industrial control devices. In fact, one could purchase automation device control software load it on a computer and if they gain access to a local industrial system network could upload, download, and otherwise manipulate the operations of substantially all automation devices therein. Failure to provide reliable and secure communication devices such as controllers and I/O devices can at the very least be fiscally detrimental to a company employing such systems as some company employees could inadvertently or intentionally make changes to systems that cause a plant to shut down of operate inefficiently. Moreover, in today's world of corporate espionage and terrorism, vulnerable factory systems make for tempting targets. In extreme cases, vulnerable manufacturing systems can expose secure information such as trade secret processes. Moreover, the infiltration of malicious programs can result in catastrophic property damage and possibly loss of human life. Accordingly, there is a need in the art for a system and method of secure device communications and digital rights management in industrial control systems.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One aspect of the present invention relates to a system and method of digital rights management for automation devices. An access component can be employed by select individuals or entities to define access rules. Access rules define the rights and privileges of individual users or entities with respect to automation devices programs, processes and other documents. For example, user A could be allowed to modify a ladder-logic program, while user B could only be allowed to view portions thereof. In addition, it should be appreciated that one or more individuals or entities can be identified by their role or position within an automation system. Hence, access rules can be defined based on roles. For example, only administrators are allowed to modify a program. Furthermore, digital certificates can be employed to facilitate identification of individuals and/or entities desirous of accessing or manipulating automation device programs, for instance. Additionally, other identification mechanisms can be employed separately or in combination with certificates to aid in identifying particular users including but not limited to subscriber identification module cards (SIM cards) and biometrics.

Another aspect of the invention provides for secure communication to and amongst industrial automation devices including controllers and I/O devices or modules. According to one aspect of the present invention, messages such as commands, programs, and data transfer are securely communicated employing public-key cryptography. In accordance therewith, automation devices can encrypt messages with a private key associated with and held in confidence by a particular device. Such a key can be built into an automation device (as well as other information and components such as the corresponding public key) according to a particular aspect of the invention. Alternatively, the key can be retrieved from a certification component, as described below. A message receiving automation device can then utilize a public key related to a particular private key to decrypt and subsequently read and/or process the sent message.

According to another aspect of the subject invention, a certification component can be employed locally within an industrial automation system. The certification component provides a local trusted authority to verify the identity of devices. In other words, I/O devices can identify themselves to controllers as real with a degree of certainty provided by the trusted certification component and controllers can identify themselves as real and deserving of trust to I/O devices. The certification component, therefore, provides a local mechanism to prevent spoofing or impersonation by malevolent persons or entities within a public key infrastructure.

According to another aspect, the subject invention can employ digital signatures to authenticate transmitted messages. In particular, hash functions or algorithms can be applied to a message to produce a message digest, which can be transmitted with the message and information regarding the hash function utilized to generate the message digest. Upon receipt of the digitally signed message component, the receiving automation device can employ provided hash information to generate a message digest utilizing the received message. If the message digest does not match the message digest provided with the sent message then a user or entity should be notified that the data has been corrupted during transmission.

According to still another aspect of the present invention, certificates can be utilized in conjunction with digital signatures to provide optimal security for communications between and amongst industrial automation devices.

The present invention is advantageous in that it provides a mechanism for secure communications amongst automaton devices, does not require Internet connectivity, or employment and payment of a third party provider of certificate authority service (e.g., VeriSign™). Furthermore, access to and use of automation devices programs and other documents can be securely managed utilizing certificates as one mechanism for identifying users or entities.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. For example, a computer readable media can include but is not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the subject invention.

Figure 1:
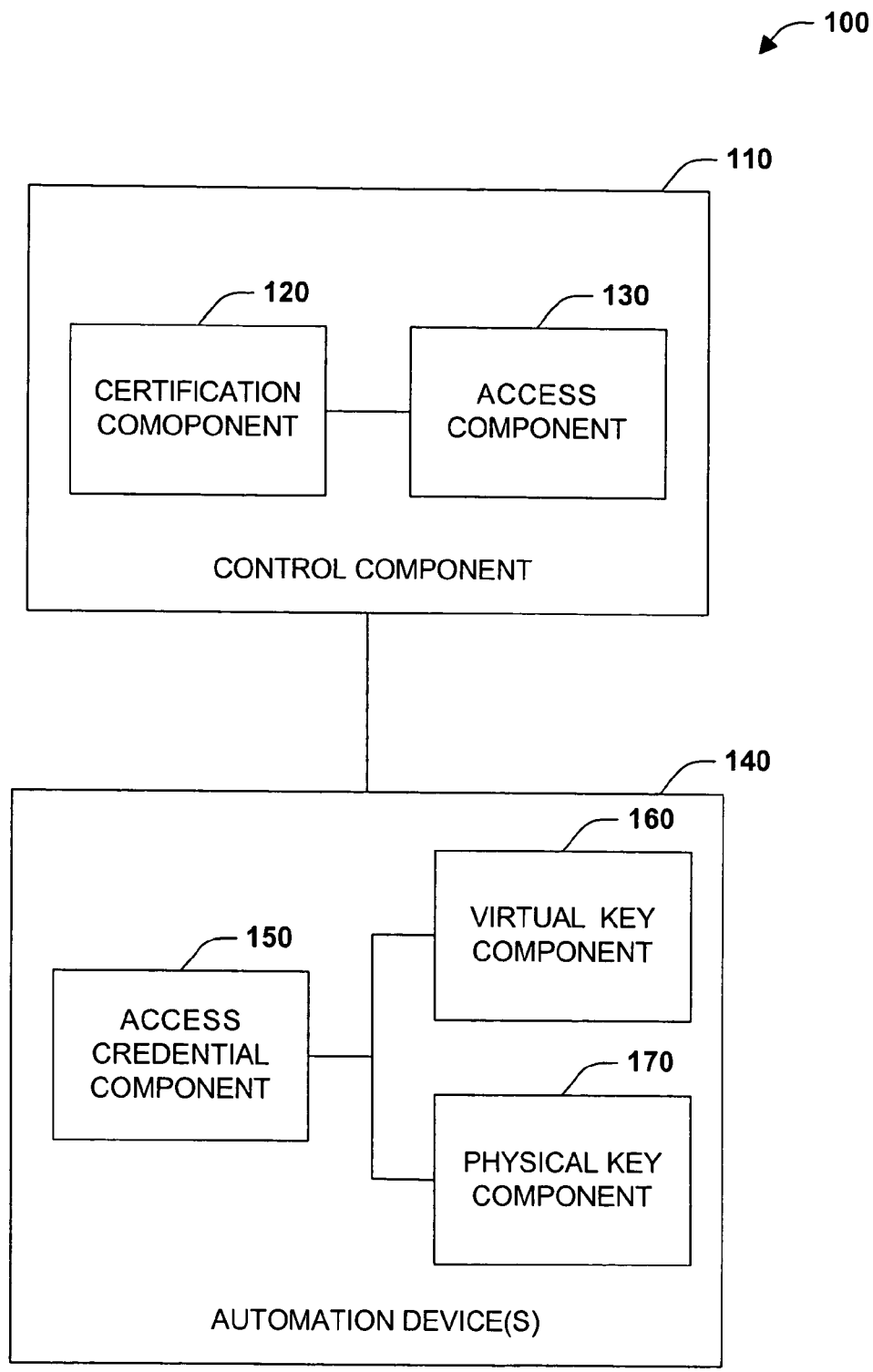
FIG. 1 is a schematic block diagram of digital rights management system in accordance with an aspect of the subject invention.

Turning initially to FIG. 1, a digital rights management system 100 is illustrated in accordance with an aspect of the subject invention. Digital rights management system 100 comprises control component 110, certification component 120, access component 130, industrial automation device(s) 140, access credential component 150, virtual key component 160, and physical key component 170. Control component 110 can be part of a control program utilized to interact and manage industrial automation device(s) 140. Industrial automation devices 140 can include but are not limited to programmable logic controllers, I/O devices, and communication adapters (e.g., bridge, gateway . . . ). Furthermore, as used herein automation devices can also refer to one or more computers utilized to program and otherwise transmit information to logic controllers with in an industrial automation environment. Control component 110 comprises a certification component 120. Certification component 120 can issue and manage digital certificates utilized to create digital signatures and public-private key pairs. Certification component 120 can be utilized in conjunction with a local computer or network device, thereby eliminating the need to connect to a wide area network such as the Internet to utilize a third party certificate authority such as VeriSign™.

Access component 130 can also be included in control component 110. Access component 130 provides a mechanism for defining rights to automation device objects and processes. Access component can utilize certificates as a means of identifying a user or entity and associating rules of use. For example, a user or entity can be allowed to monitor control logic and not edit or download a new program. Alternatively, a user or entity may only be allowed to view certain portions of a program or create input rungs and not output rungs in a ladder logic program. In brief, the subject invention can support any rule of use that can be specified. Hence, access to industrial control device processes can also be specified to be limited based on a further means of identification in addition to that established by digital certificates, as described in more detail, infra. Once rules of use are specified they can be downloaded to an automation device 140. It should be appreciated that access to the access component itself needs to be secure. Accordingly, certificates can be utilized to verify and gate access to the access component 130. However, other systems and methods of permitting only authorized users to log into the access component 130 can also be employed (e.g., password, cards, biometrics . . . ).

Industrial automation device(s) 140 can comprise, inter alia, an access credential component 150. Access credential component 150 can include a list of rules of use associated with particular users or entities as provided by the access component 130, for example. One important aspect of providing security, involves properly identifying users or entities. According to one aspect of the invention, identification can be based on certificates provided by a local certification component 120. However, identification can also be based on other means and mechanisms including but not limited to subscriber identity module cards (SIM cards) or other smart cards. For example, SIM cards can be issued to users providing an encrypted personal id (PID) that can be read by an industrial automation device 140 (e.g., by inserting the card into a slot on the controller). This can provide an additional or separate layer of security to insure that the proper rules of use are associated with the proper individual. Furthermore, it should be appreciated that other means of identification can be employed herewith such as biometrics (e.g., fingerprint, retinal scan, hand geometry, facial features, voice recognition . . . ).

Certificates can be utilized alone or in conjunction with other means of identification. Virtual key component 140 is adapted to retrieve identification information from certificates. Physical key component 150 provides a mechanism for retrieving identification information from other physical sources such as SIM cards and biometric interfaces. Identifying information provided by either or both of the virtual and physical key components can be employed to verify identity and permit access in accordance with the rules as specified in the access credential component 150.

Figure 2:
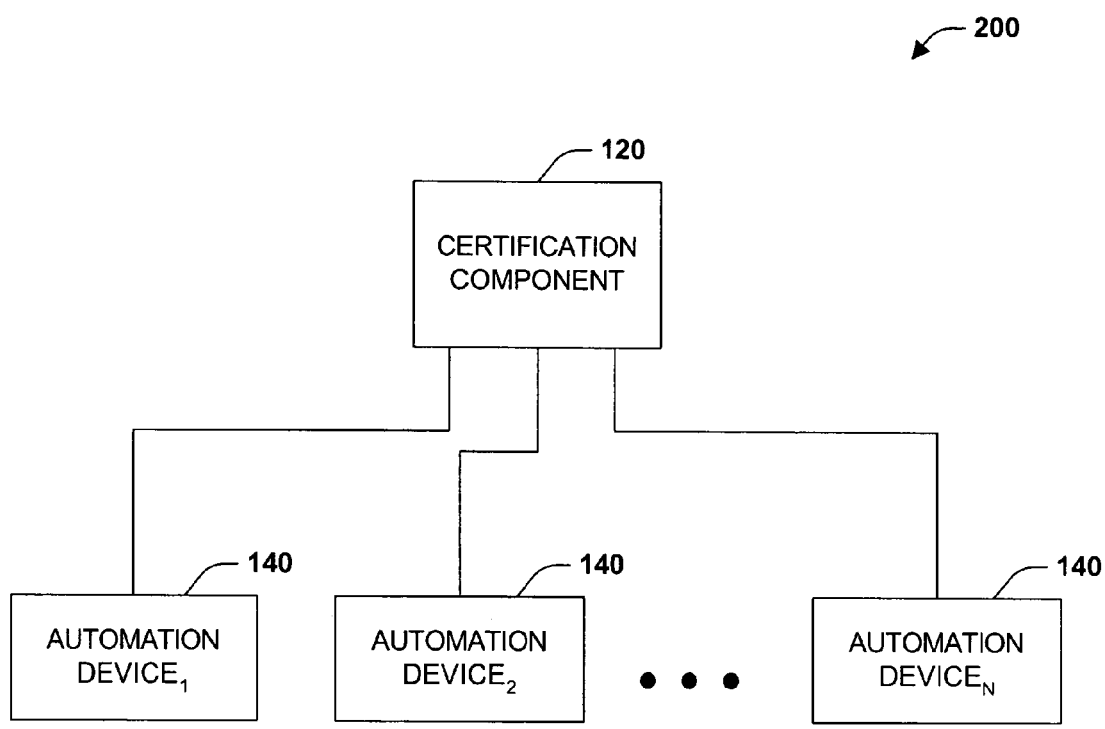
FIG. 2 is a schematic block diagram of a secure method of communications utilizing a certification component in accordance with an aspect of the present invention.

Turning to FIG. 2, a system of secure automation device communication 200 is depicted in accordance with an aspect of the subject invention. System 200 comprises a plurality of industrial automation devices 140 (automation device1, automation device2 through automation deviceN, where N is an integer greater than or equal to one), and a certification component 120. Industrial automation devices 140 correspond to special purpose computers including industrial controllers for controlling industrial processes, manufacturing equipment, and other factory automation as well as input/output (I/O) devices that receive and execute commands from industrial controllers. The present invention can utilize symmetric key cryptography or asymmetric or public key cryptograph to facilitate secure communication to and amongst industrial automation devices 140. Symmetric key cryptography utilizes one common key known to both a sender and a receiver to encrypt and decrypt messages. Public key cryptography employs two keys: a public key and a private key. These keys are algorithms that are mathematically related such that one key can sign or encrypt a message and the other can verify or decrypt the message. Either of the two keys in a public key cryptography system can sign or encrypt a message so long as the other key provides the opposite functionality, to wit verification or decryption. In other words, the key pairs are inverse functions of one another; data manipulation by one key can be undone by the other and vice-versa. The primary difference between keys is that a private key is held securely by a device while the public key can be widely distributed or accessible to local networked industrial automation devices 140, for example. A public key can be widely distributed at least because it is computationally infeasible to deduce the private key of a private-public pair from a single public key. Accordingly, if automation device1 wished to send a secure message such as a control command or program to automation device2, then device1 could encrypt the message with its private key and transfer the message to device2. Subsequently, device2 could retrieve the widely disseminated public key associated with the private key to decrypt and thereafter process the received message. However, a problem exists when communicating using public keys which is that although the message may be securely transferred, there is no way to know with any degree of certainty that device1 is actually associated with the retrieved public key. A malicious individual or entity could send a message to device2 claiming to be device1. More specifically, deceptive spoofing or impersonation could occur if a message was encrypted with a private key of some computer related entity and the corresponding public key indicates that it belongs to device1, for example. Hence, there needs to be a way to verify that the widely distributed or accessible key is actually associated with the particular device with which it claims to be associated. Otherwise, security breaches can occur within an industrial system that can at the very least be fiscally detrimental to a company employing an industrial system. More importantly, security breaches could result in catastrophic damage to automation devices 140 and physical property as well as the possible loss of human life. Accordingly, there needs to be a way to verify that a controller issuing commands to an I/O device is the controller it appears to be and that the I/O device is the proper device sought to be controlled. Utilizing digital certificates is one way to address this problem.

Figure 3:
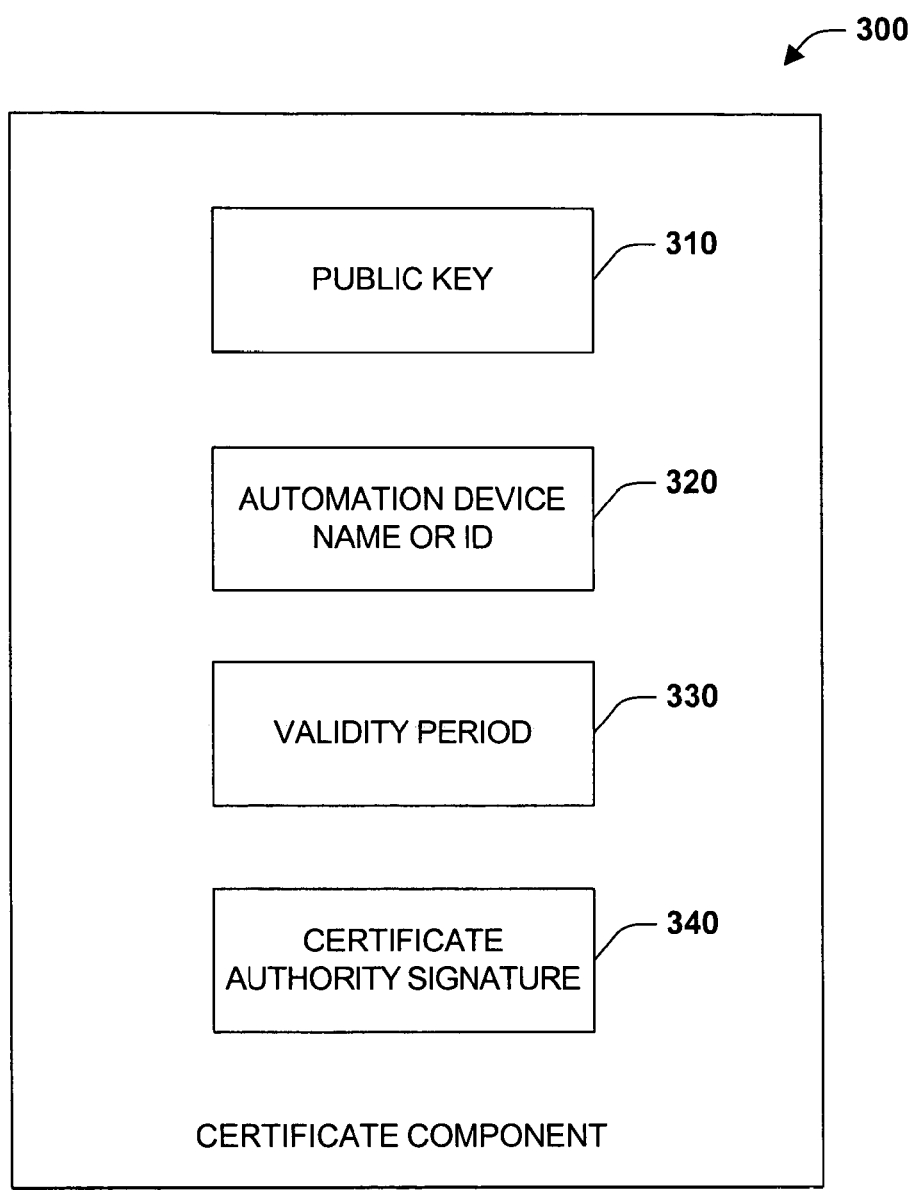
FIG. 3 is a schematic block diagram of an exemplary certificate component in accordance with an aspect of the present invention.

Certification component 120 issues and manages certificates utilized to create digital signatures and public-private key pairs. Certification component 120 can be utilized in conjunction with a local computer or network device, thereby eliminating the need to connect to a wide area network such as the Internet to utilize a third party certificate authority such as VeriSign™. Turning briefly to FIG. 3, an exemplary certificate component 300 is depicted in accordance with an aspect of the subject invention. A certificate component 300 (or simply a certificate) can comprise a public key 310, automation device or user name or ID 320, a validity period 330, and a certification authority signature 340, among other things. The public key 310 is utilized to decrypt or alternatively encrypt a message in accordance with a public key cryptographic system. The automation device or user name or ID 320 identifies the automation device or user that is associated with the public key 210. Furthermore, according to an aspect of the present invention the ID 320 can also identify a user role or position (e.g., administrator). Validity period 330 specifies a period of time in which the certificate 300 is valid. After expiration of the validity period the certificate may be unavailable for use or may be available but unable to guarantee trustworthiness. The validity period 330 is in essence an extra security precaution to ensure data reliability. Certificate authority signature 340 can also be included in the certificate component 300. Certificate authority signature 340 is available to facilitate verification of the authenticity and integrity of the certificate component 300 data. The signature can be verified utilizing a series of steps and components as described in detail in later sections. Certificate signature 340 is often useful during set-up when an automation device does not initially recognize the trustworthiness of the certificate. Once initially validated the certificate signature can be assumed to be reliable unless some other incident occurs to challenge that assumption such as expiration of the validity period or revocation of the certificate by the certification component 120 (FIG. 2). It should be appreciated that the certificate component 300 can be a X.509 digital certificate which is a conventional and widely used standard for digital certificates that has been recommended by the International Telecommunications Union (ITU).

Returning briefly to FIG. 2, once industrial automation devices 140 are installed, for example in a factory, they can request or be programmed to receive certificates from certification component 120. Certification component 120 can then generate a private public key pair and provide a device 140 with a unique private key. In addition, the certificate component can generate a particular certificate that identifies a device and contains the public key that corresponds to the private key issued to the device. Alternatively and in accordance with an aspect of the present invention, each automation device 140 can be designed to include a private key and a built-in certificate providing, inter alia, the corresponding public key of the public-private key pair. Upon installation into an industrial automation system, the automation device 140 can simply provide certification component 120 with a certificate component 300 to facilitate wide spread access and/or distribution thereof.

Figure 4:
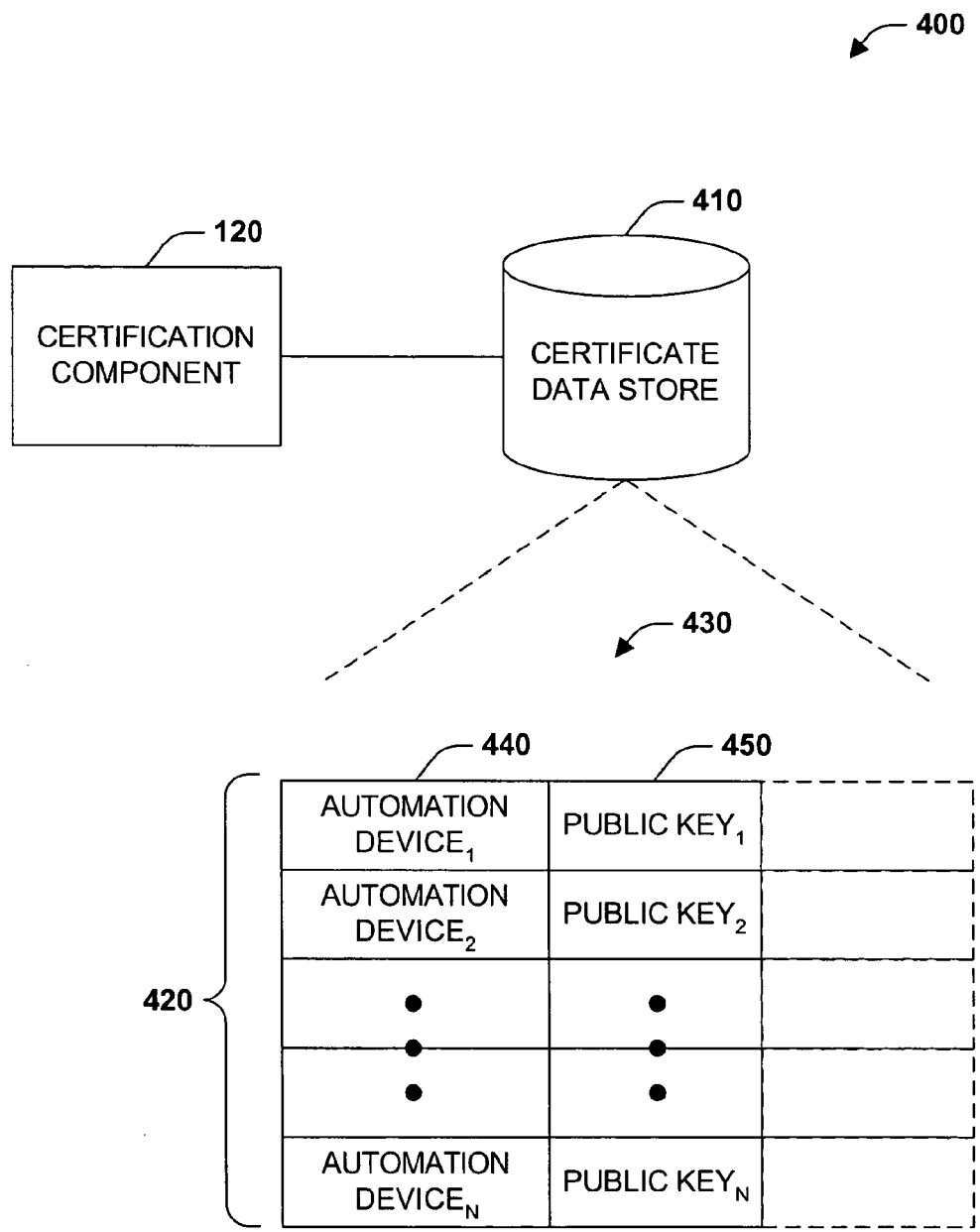
FIG. 4 is a schematic block diagram of a certificate management system in accordance with an aspect of the subject invention.

Turning to FIG. 4, a certificate management system 400 is illustrated in accordance with an aspect of the present invention. Certificate management system comprises a certification component 120 and a certificate store 410. Upon generation of a certificate component 300 (FIG. 3), the component can be stored in a certificate store 410. The certificate store acts as an organized repository for certificate components. For example, certificate store 410 can store certificates as records 420 in a table of records 430. Accordingly, each record can contain field corresponding to the parts of a certificate including device ID 440 and public key 450. Once and industrial system is properly set up in accordance with an aspect of the invention, each automation device can have a certificate stored in the certificate store which supplies, inter alia, an automation device name or ID and its associated public key. Thereafter, automation devices can communicate between and amongst themselves securely employing certificates, thereby allowing the identity of each device sending a message being known with a much higher degree of certainty would otherwise be known without certificates.

Figure 5:
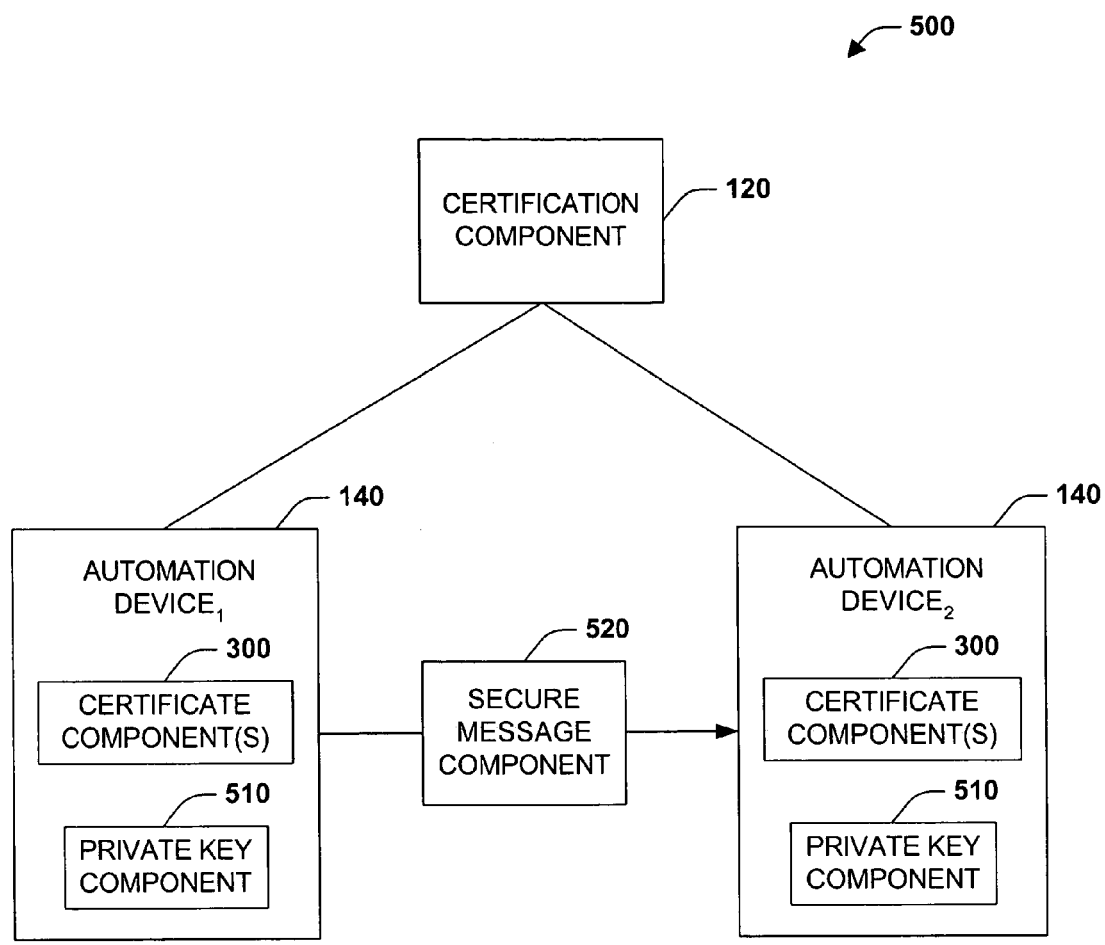
FIG. 5 is a schematic block diagram of an automation device communication system in accordance with an aspect of the present invention.

FIG. 5 depicts a system 500 of secure automation device communication in accordance with an aspect of the subject invention. Communication system 500 includes a certification component 120, automation devices 140 (i.e., automation device1 and automation device2), certificate component(s) 300, private keys 510, and secure message component 520. Automation devices 140 can communicate securely via wire or wirelessly utilizing certificate components 300 and private keys 510. For example, if device1 wished to communicate a message such as a program (e.g., programmable logic controller (PLC) program) to device2, then device1 can utilize its private key 510 to encrypt the message and thereby creating a secure message component 520 which can be transmitted to device2. Upon receipt of the secure message component 520, device2 can search locally to determine weather or not it has the public key and the certificate stored associated with the encrypted message. If it does not have the certificate and key, then device2 can request and receive the appropriate certificate from the certification component 120. Alternatively, device2 could retrieve the certificate from a certificate database or store (not shown). However, it should be appreciated that allowing direct access to certificates is not as secure as going though an intermediary such as certification component 120, at least because certificates could be tampered with and corrupted. Once device2 locates the appropriate certificate it can utilize the public key to decrypt the key, verify its digital signature (described in the next section), and read or process the message. It should also be appreciated and noted that the nature of public-private key pairs enables communication to be communicated in an inverted manner. For example, assuming again that device1 desires to communicate a message or program to device2, then device1 could first try and locate the certificate associated with device2 with which it would like to communicate. First device1 could search locally to determine whether it had previously loaded the certificate for device2. If the certificate was not previously loaded, device1 can request and download the certificate from the certification component 120 or alternatively from a certificate data store, as discussed supra. Once in possession of the certificate, device1 can utilize the particular public key associated with the certificate to encrypt a message or program thereby creating a secure message component 520 that can subsequently be transmitted to device2. Device2 can then receive the message component, decrypt it utilizing its private key 510, and then validate or authenticate the message utilizing a digital signature, as discussed hereinafter.

Figure 6:
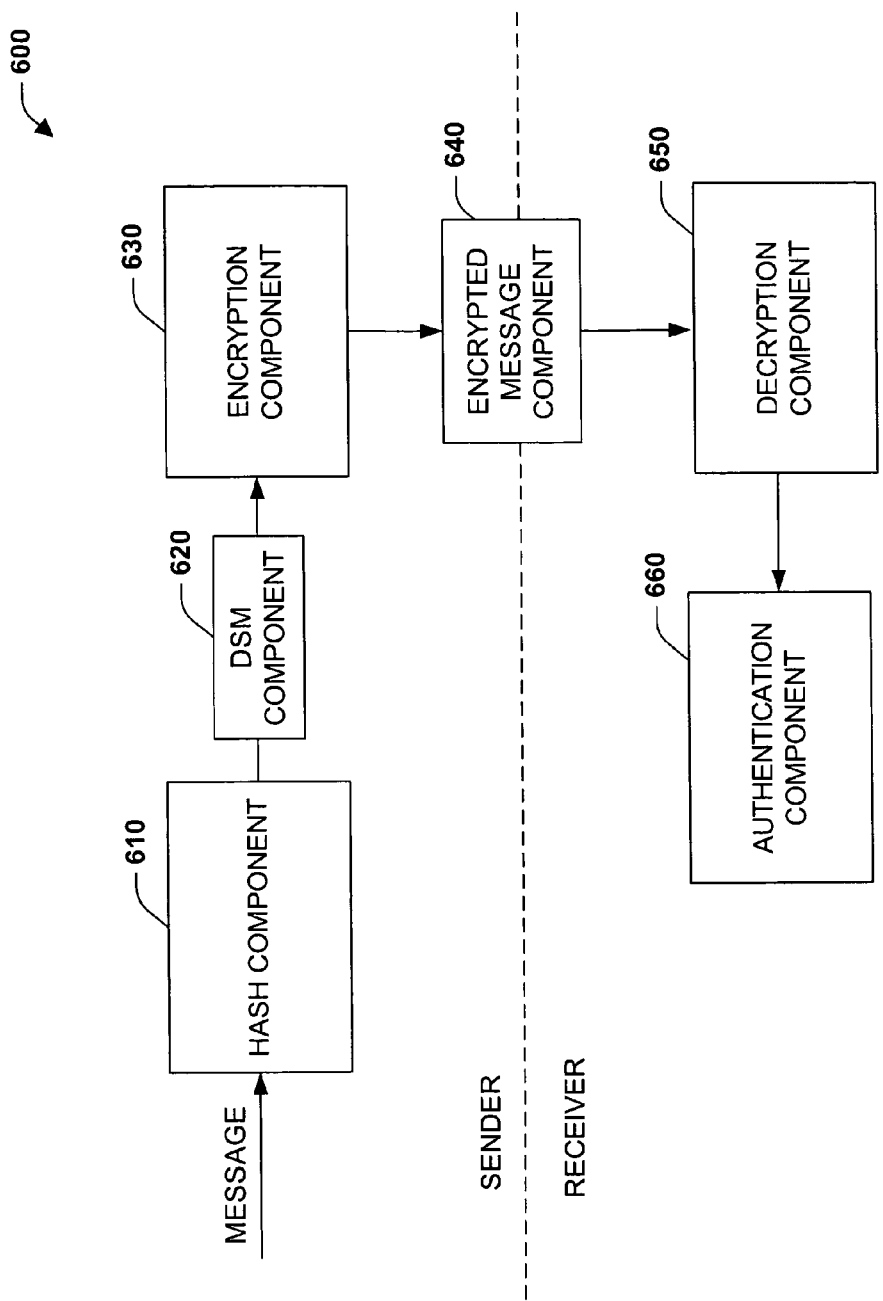
FIG. 6 is a schematic block diagram of a digital signature generation system in accordance with an aspect of the subject invention.

FIG. 6 illustrates a digital signature system 600 in accordance with an aspect of the subject invention. Digital signatures can be utilized to verify the integrity of transmitted data. In particular, digital signatures can ensure that a message receiver can confirm that the message has not been altered during transmission. Accordingly, an industrial automation device could verify that a program transferred from a controller, for example, has not been corrupted. Digital signature system 600 comprises a hash component 610, a digitally signed message component 620, an encryption component 630, an encrypted message component 640, a decryption component 650, and an authentication component 660. Hash component 610 is adapted to receive a message such as a PLC program from an automation device. The hash component 610 can then apply a hash function to the message. A hash function transforms a variable size input message into fixed size output string. This output or message digest is typically much smaller than the variable size input. Furthermore, the hash function is "one way", meaning that it is easy to convert a message to a message digest, but computationally infeasible to determine the input message given the message digest and the hash function. Additionally, the hash function can be collision free or a degree thereof. Hash functions map variable length message to fixed size output hashed, consequently there is some potential for some inputs to map to the same output hash. However, this problem can be averted for most purposes by selecting particular types of hash functions. For example, a hash function is weakly collision free if given an input X it is computationally infeasible to locate another input Y that maps to the same output (H(X)=H(Y)). A strongly collision free hash function is one in which it is computationally infeasible to find two inputs that map to the same output. Conventionally well known hash functions that can be employed in accordance with the subject invention including but not limited to MD5 (Message Digest 5 developed by Rivest) and SHA (Secure Hash Algorithm developed by the National Institute of Standards and Technology). Subsequently the hash component can construct a digitally signed message component 620.

Figure 7:
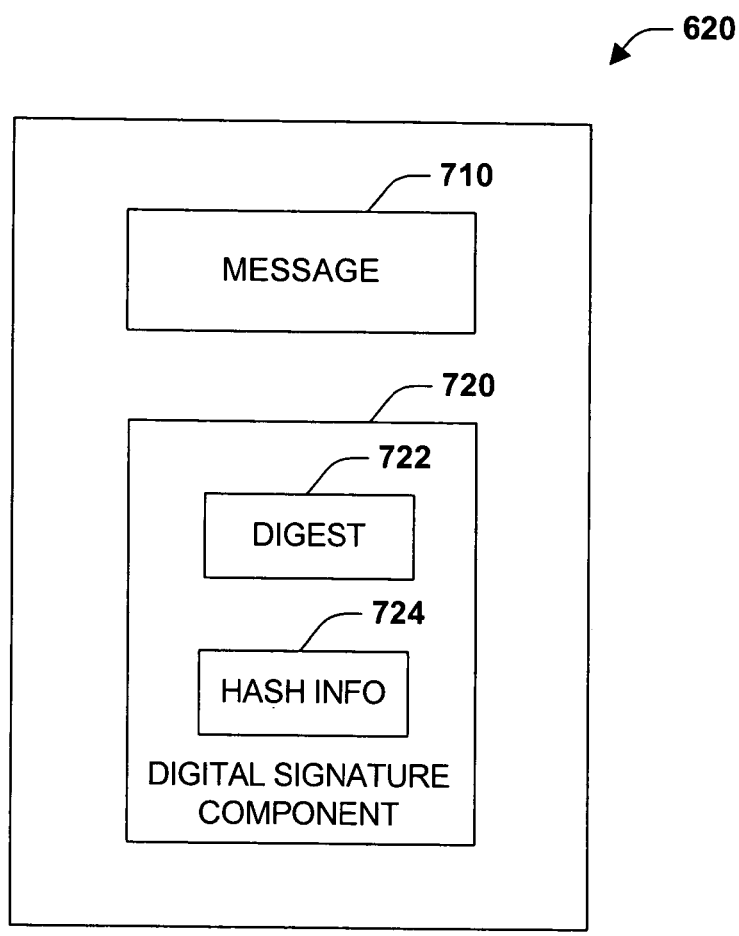
FIG. 7 is a schematic block diagram of a digital signature message component in accordance with an aspect of the present invention.

Turning briefly, to FIG. 7, a digital signature message component 620 is illustrated in accordance with an aspect of the present invention. Digital signature message component 620 comprises a message 710. The message can be any information that an automation device would like to communicate to another automation device such as commands or a PLC program, for example. Message component also has a digital signature component 720 associated, linked, or embedded therewith. Digital signature component 720 includes message digest 722 and hash information 724. Message digest 722 contains the output value of a hash function applied to the original message 710. As discussed supra, the message digest is a short and fixed length representation of a longer variable length message. The message digest facilitates detection of alteration of a message in transit by comparing the provided message digest 722 with a second digest generated on the received message by the receiving entity. Hash information 724 provides data concerning the actual hash function utilized to generate the message digest (e.g., MD5, SHA . . . ). This information can then be utilized by the device receiving the digital signature message component 620 to verify that the message sent is the same message received, by generating a second message digest utilizing hash information 722 and the received message and subsequently comparing the generated digest to the provided message digest 722. If the two digests are not the same, then the receiving entity will know that the message as been altered.

Returning to FIG. 6, once the digital signature message component has been generated it can be transmitted to and received by encryption component 630. The encryption component 630 can then utilize a sending device's private key or the receiving device's public key to encrypt the digital signature component 720 (FIG. 7) and/or the message component 710 (FIG. 7) of the digital signature message component. Subsequently, an encrypted message component 640 can be created containing the message and the digital signature component to be transmitted to another device. Such transmission can be via wire or wirelessly over a local area network, for example. Decryption component 650 is adapted to receive encrypted message components 640. Upon receipt, decryption component 650 decrypts encrypted portions of a message component 640 by employing either a public or private key associated with the corresponding key of the public-private key pair used to encrypt the message. For example, if message portions were encrypted utilizing the public key of the receiving device, then the receiving device can utilize its private key for decryption. Furthermore, it is to be appreciated that the decryption process can utilize the aforementioned system for employing certificates to verify that the message component is from the device it is supposed to be from. After an encrypted message component 640 is decrypted it is passed to the authentication component 660. Authentication component 660, reads the hash information contained in the digital signature component, retrieves the identified hash function, and applies it to the sent message to generate a message digest. The authentication component 660 then compares the generated message digest with the message digest transmitted with the digital signature message component 620. If they are the same then the message has not been altered. If the digests are different then the message has be tampered with or otherwise corrupted. The authentication component 660 can subsequently notify the receiving device if the message is corrupt. Furthermore, it should be noted and appreciated that the digital signature message component can be transmitted directly to the authentication component 660 bypassing the encryption and decryption components 630 and 650, if so desired. Encryption simply provides an additional level of security.

Figure 8:
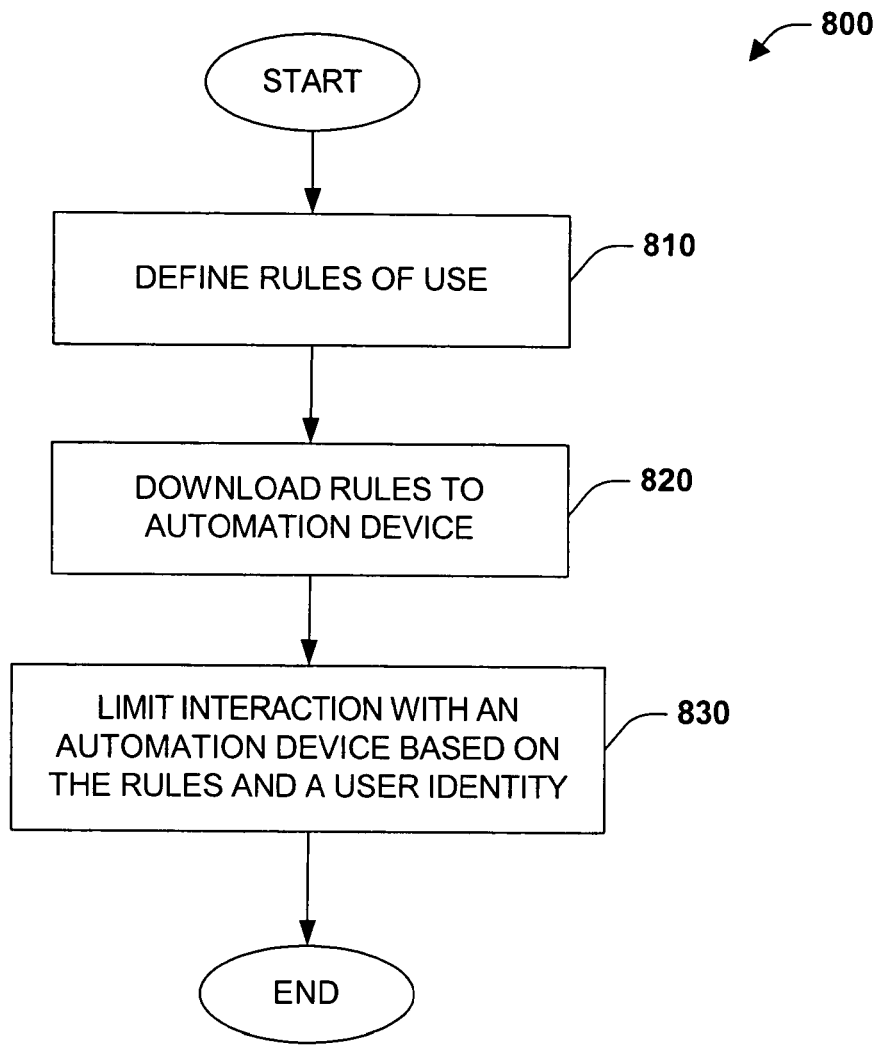
FIG. 8 is a flow chart diagram of an automation device digital rights methodology in accordance with an aspect of the subject invention.
Figure 9:
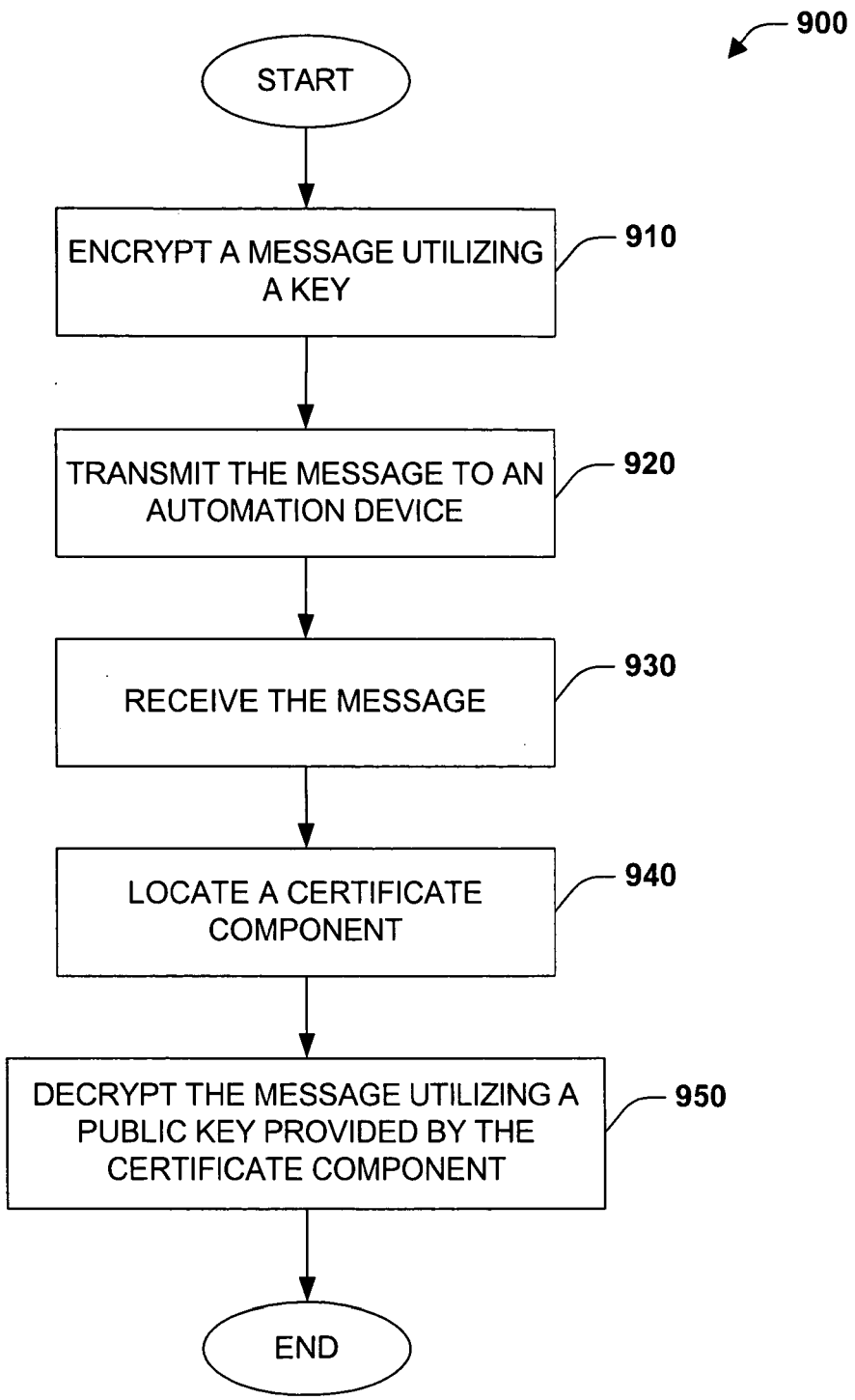
FIG. 9 is a flow chart diagram of an automation device communication methodology in accordance with an aspect of the subject invention.
Figure 10:
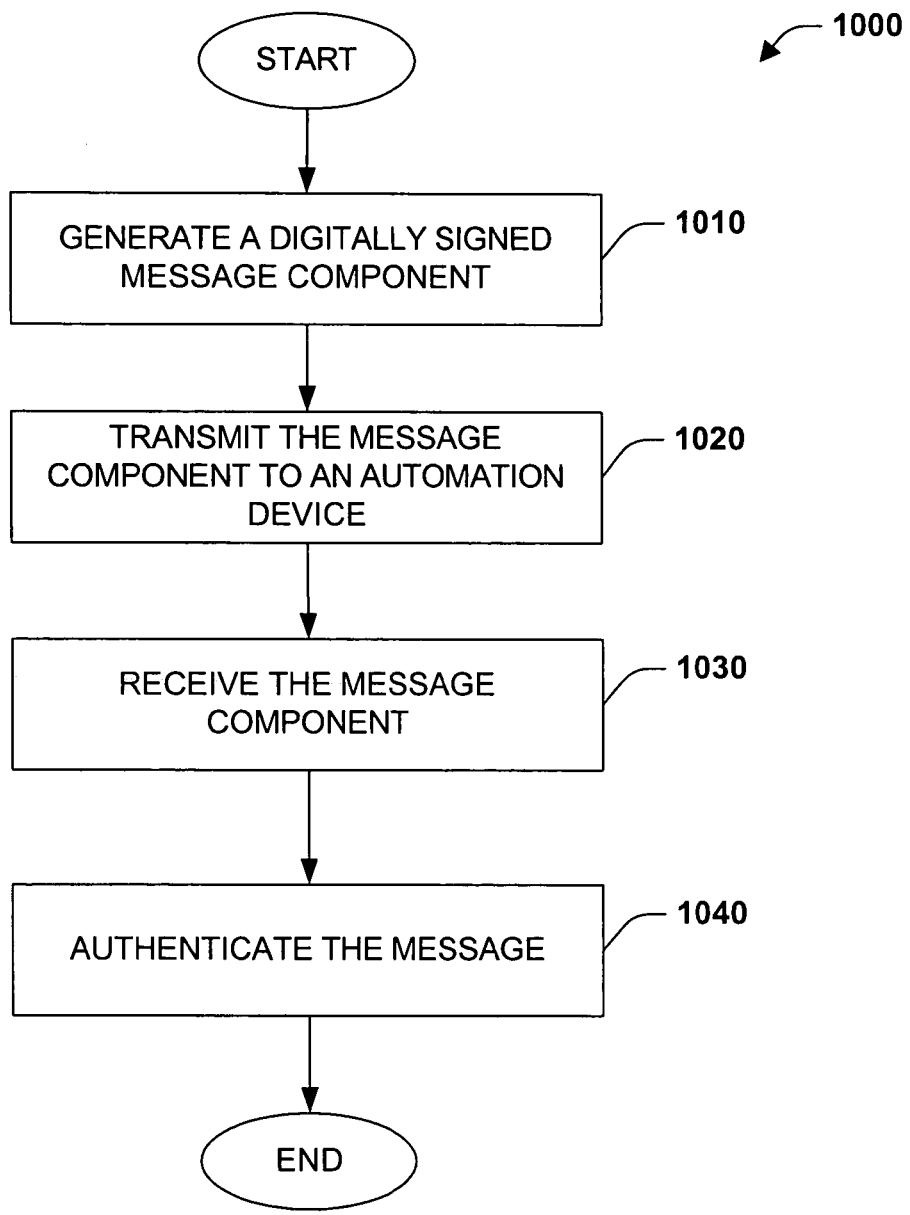
FIG. 10 is a flow chart diagram of an automation communication methodology in accordance with an aspect of the present invention.

In view of the exemplary systems described supra, a methodology that may be implemented in accordance with the present invention will be better appreciated with reference to the flow charts of FIGS. 8-10. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

FIG. 8 is a flow chart diagram illustrating a digital rights methodology in accordance with an aspect of the subject invention. At 810, rules of use are defined. Rules of use can correspond to automation device program or process privileges. Such privileges can be defined for individual users or their roles (e.g., administrator) or other entities such as other automation devices. Rules can include rights to view, modify, download, and upload all or portions of an automation device program, inter alia. According, to one aspect of the subject invention an automation device program can be a programmable logic controller (PLC) ladder logic program. At 820, the rules can be downloaded an automation device such as a programmable logic controller (PLC) or I/O device. Next, at 830, interaction with the automation device is limited based on the rules and a user identity. User identity can be established utilizing digital certificates according to one aspect of the invention. For example, if a user wishes to download a program to a controller, the controller will first receive a certificate associated with the user and compare it with its rules of use to determine if such user has privileges to download programs to the controller. Furthermore, it should be appreciated that other methods and mechanisms can be employed alone or in combination with digital certificates to verify user identity including but not limited to SIM or smart cards and biometric recognition systems (e.g., fingerprint, retinal scan, hand geometry, facial features, voice recognition . . . ).

According to particular aspect of the invention, the methodology 800 can be utilized to protect PLC logic programs. Hence, particular users may be able to view and modify program rungs while others may only be able to view portions of the program. This can be particularly advantageous in industries where control processes are held as trade secrets (e.g., soft drinks, cleaning solutions . . . ). In such a scenario, the present methodology can be employed to limit access to the process to only a few high level people, for example, to preserve secrecy.

In FIG. 9, an automation device communication methodology 900 is depicted in accordance with an aspect of the present invention. At 910, a message is encrypted utilizing a key. The message can be commands or instructions for example in an industrial automation device program (e.g., PLC program). The key is one of a public-private key pair as used in public key cryptography. For example, the key can be a private key associated with the particular device sending the message. After the message is encrypted, it can be transmitted to an automation device at 920. Transmission can be via wire (e.g., Ethernet, power line, backplane . . . ) or wirelessly. Subsequently, another automation device can receive the transmitted message at 930. At 940, the receiving automation device locates a certificate associated with the sending device. For instance, the device can search its local data store for the certificate. Alternatively, the device can contact a certification component and download the certificate therefrom. The certificate component is a trusted component, hence if the certificate states it corresponds to a device one can assume with a high degree of certainty that it is actually related to such a device rather than some impersonating device. A certificate contains, inter alia, a public key. Once the appropriate certificate is located and loaded, the public key associated therewith can be employed at 950 to decrypt the sent message. Thereafter, the receiving automation device can process the message (e.g., execute a PLC program).

FIG. 10 depicts another automation device communication methodology 1000 in accordance with an aspect of the subject invention. At 1010, a digitally signed message component is generated. The digitally signed message includes but is not limited to a message, a message digest and hash information or data. Such a message can be created by applying a hash function or algorithm to the message to be sent to generate a message digest. As described supra, the message digest is a short fixed length representation of a typically longer and variable length message. Hash information describes the hash algorithm utilized to generate the digest (e.g., MD5, SHA . . . ). At 1020, the digitally signed message is transmitted via wire or wirelessly to an automation device. The automation device then receives the message at 1030. Subsequently, the message is authenticated at 1040. Authentication comprises generating a second message digest using the hash identified by the hash information and the received message. The message digests are then compared. If the digests are the same the message has been transmitted successfully. Alternatively, if the digests are not the same then the message has been tampered with or otherwise corrupted during the transmission to the device.

Figure 11:
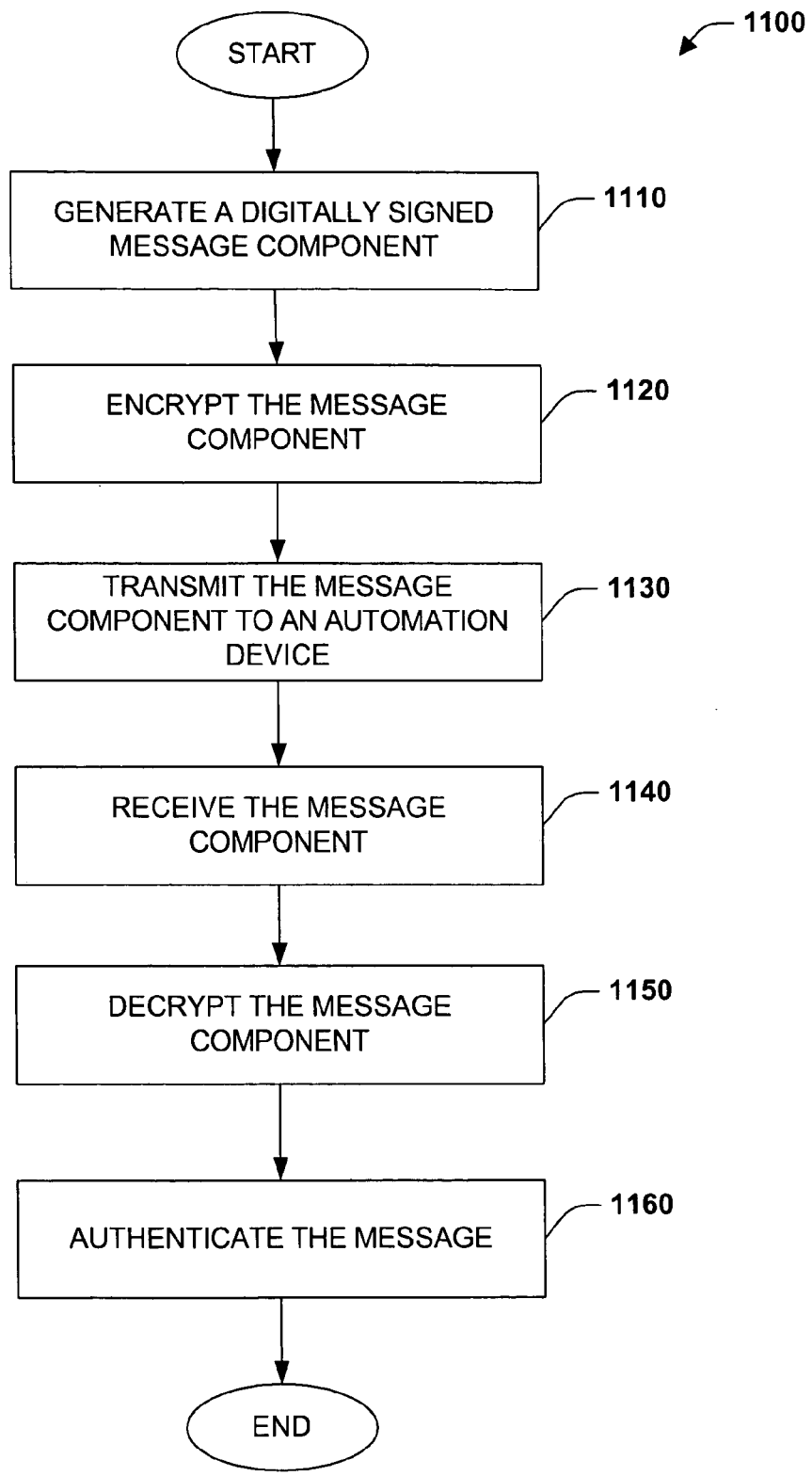
FIG. 11 is a flow chart diagram illustrating an automation communication methodology in accordance with an aspect of the present invention.

FIG. 11 depicts yet another automation device communication methodology 1100 in accordance with an aspect of the subject invention. At 1110, a digitally signed message component is generated. Such a message can be generated by applying a hash function or algorithm to a message to produce a message digest. The message digest is a short fixed length representation of a typically longer and variable length message. Subsequently, the message digest, information regarding the hash function utilized to produce the digest, and the original message are combined into a single message component. At 1120, the generated digitally signed message component is encrypted for example utilizing public key cryptograph. In accordance therewith, the first sending automation device can use its private key to encrypt the message to be sent. Alternatively, the first automation device can employ a second automation device public key to encrypt the message. At 1130, the encrypted digitally signed message component is transferred to a second automation device over a local area network (e.g., via wire or wirelessly). The message is then received by the second automation device at 1140. At 1150, the message component is decrypted, for example employing a public key provided by a certificate or a private key associated with the receiving device. Thereafter, the decrypted message is authenticated at 1160. Authentication includes determining the hash algorithm used to generate the message digest and producing a second message digest on the received message using the same hash algorithm. The original message digest and information concerning the hash algorithm used to construct the message digest can be transmitted with the message in a message component. The original message digest and the later created message digest can be compared to determine the authenticity of the received message. If the digests are different then the receiving device can be notified that the message has been corrupted. If the digests are the same the message sent can be assumed with a high degree of certainty to be the same as the message received.

Figure 12:
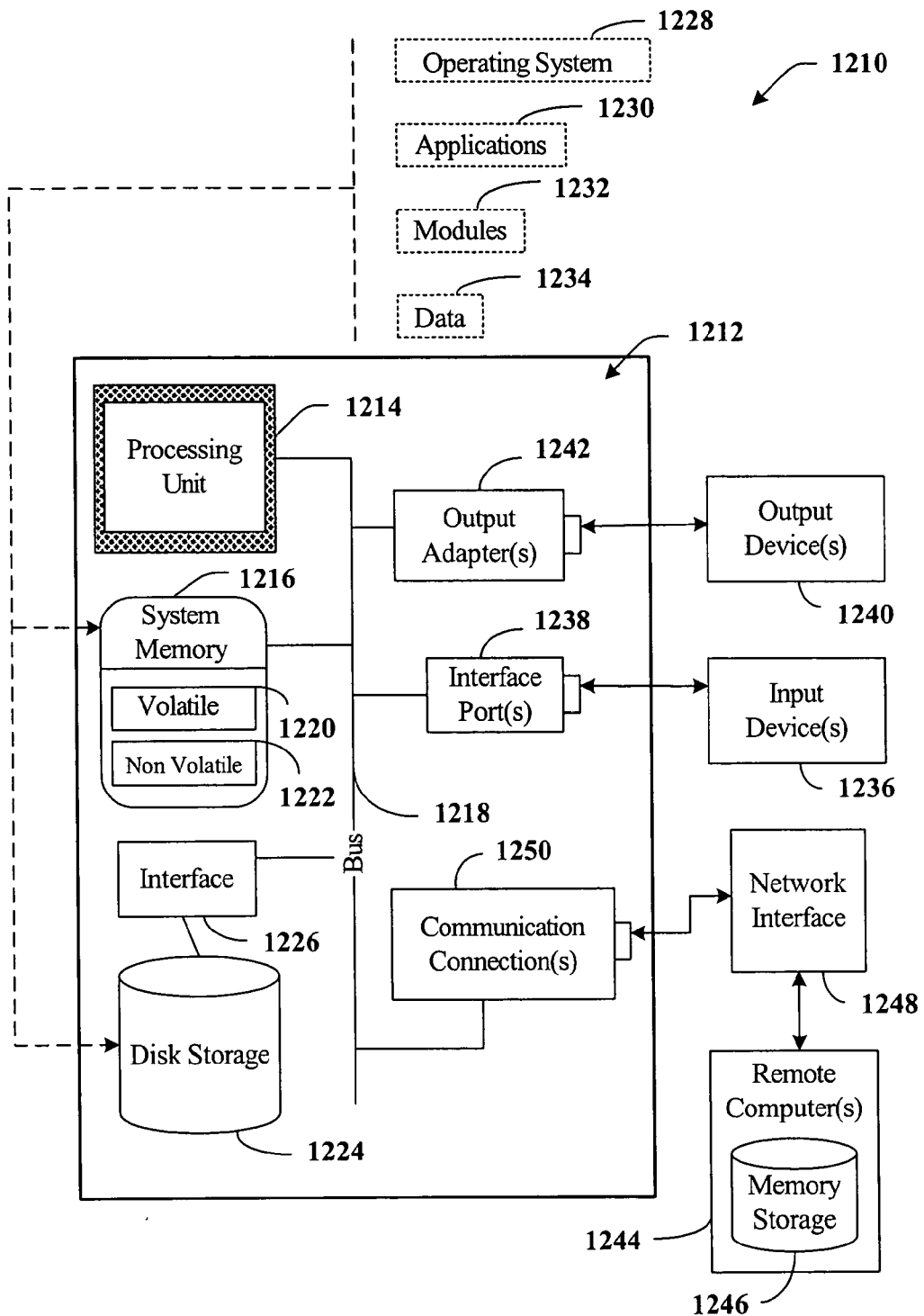
FIG. 12 is a schematic block diagram illustrating a suitable operating environment in accordance with an aspect of the present invention.

In order to provide a context for the various aspects of the invention, FIG. 12 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/nonvolatile computer storage media. FIG. 12 illustrates, for example disk storage 1224. Disk storage 4124 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim

What is claimed is:

1. A first industrial automation device, comprising:
a memory that stores computer executable instructions; and
a processor, communicatively coupled to the memory, that facilitates execution of the computer executable instructions to perform operations, comprising:
receiving a communication message that facilitates modification of an industrial automation program related to the first industrial automation device of an industrial automation network, wherein the communication message comprises sender data indicative of a second industrial automation device of the industrial automation network;

in response to the receiving the communication message, receiving, from a local network device of a local area network that is coupled to the first industrial automation device and the second industrial automation device and does not include a wide area network, digital certificate data associated with the second industrial automation device, wherein the digital certificate data is determined by the local network device based on certificate information indicative of a certificate authority signature that is transmitted from the second industrial automation device to the local network device in response to the second industrial automation device being determined to be installed within the industrial automation network; and based on the digital certificate data, verifying that the communication message has been sent by the second industrial automation device.

2. The first industrial automation device of claim 1, wherein the operations further comprise:

determining, based on the digital certificate data, role data indicative of role of the second industrial automation device.

3. The first industrial automation device of claim 2, wherein the operations further comprise:

limiting the modification to at least a portion of the industrial automation program based on the role data.

4. The first industrial automation device of claim 2, wherein the role data is further determined based on information received from a subscriber identification module associated with the second industrial automation device.

5. The first industrial automation device of claim 1, wherein the digital certificate data comprises information indicative of an entity identifier.

6. A non-transitory computer readable storage medium comprising computer-executable instructions that, in response to execution, cause an industrial automation system comprising a processor, to perform operations, comprising:

receiving a communication message that facilitates a modification of an industrial automation program related to a first industrial automation device of the industrial automation system, wherein the communication message comprises sender data indicative of a second industrial automation device of the industrial automation system;

in response to the receiving, requesting, from a certificate data store of the industrial automation system that is locally coupled to the first industrial automation device and the second industrial automation device via a set of network devices of a local area network that does not include a wide area network, digital certificate data associated with the second industrial automation device, wherein the digital certificate data comprises certificate authority signature data that is transmitted from the second industrial automation device to the certificate data store in response to an installation of the second industrial automation device within the industrial automation network; and based on the digital certificate data, confirming that the communication message has been sent by the second industrial automation device.

7. The non-transitory computer readable storage medium of claim 6, wherein the digital certificate data comprises information indicative of a public key.

8. The non-transitory computer readable storage medium of claim 6, wherein the digital certificate data comprises information indicative of a time period during which the digital certificate data is valid.

9. The non-transitory computer readable storage medium of claim 6, wherein the operations further comprise:

based on the digital certificate data, determining role data indicative of a role of the second industrial automation device, wherein the modification is authorized based on the role data.

10. The non-transitory computer readable storage medium of claim 9, wherein the determining comprises determining the role data based on information received from a subscriber identification module of the second industrial automation device.

11. The non-transitory computer readable storage medium of claim 6, wherein the operations further comprise:

based on the digital certificate data, determining position data indicative of a position of the second industrial automation device within the industrial automation system, wherein the modification is authorized based on the position data.

12. The non-transitory computer readable storage medium of claim 11, wherein the modification is authorized in response to determining that the position data satisfies a defined access criterion associated with a set of access rights defined by a third industrial automation device of the industrial automation system.

13. The non-transitory computer readable storage medium of claim 12, wherein the first industrial automation device is an industrial controller device and the access rights comprise information indicative of at least one of:

a right to modify a ladder logic program associated with the industrial controller device, or a right to view the ladder logic program.

14. The non-transitory computer readable storage medium of claim 6, wherein the first industrial automation device is an input/output device.

15. A method, comprising:

in response to determining that a first industrial automation device has been installed within an industrial automation network, receiving, by an industrial controller comprising a processor, digital certificate data comprising certificate authority signature data indicative of a certificate authority signature of the first industrial automation device, wherein the receiving comprises receiving the digital certificate data from the first industrial automation device via a first set of local network devices of a local area network that does not include a wide area network; and in response to determining that a second industrial automation device has received, from the first industrial automation device, a communication message that facilitates a modification of an industrial automation program related to the first industrial automation device, directing, by the industrial controller, the digital certificate data to the second industrial automation device via a second set of local network devices to facilitate a verification that the communication message has been sent by the first industrial automation device.

16. The method of claim 15, further comprising:

directing, by the industrial controller, rule data to the second industrial automation device via the subset of the set of local network devices, wherein the rule data is indicative of a set of access rules assigned to respective positions within an industrial automation system.

17. The method of claim 16, further comprising:
    determining the rule data comprising determining information indicative of at least one of:
       a first authorization criterion to download first file data from the second industrial automation device, or
       a second authorization criterion to upload second file data to the second industrial automation device.

18. The method of claim 15, wherein the receiving the digital certificate data comprises receiving public key data related to the first industrial automation device.

19. The method of claim 15, wherein the receiving the digital certificate data comprises receiving information indicative of an entity identifier related to the first industrial automation device.

20. The method of claim 15, wherein the receiving the digital certificate data comprises receiving information indicative of a time period during which the digital certificate data is valid.

* * * * *